United States Patent [19]

Cassidy et al.

[11] Patent Number: 4,740,957
[45] Date of Patent: Apr. 26, 1988

[54] ASYNCHRONOUS ADDRESSABLE ELECTRONIC KEY TELEPHONE SYSTEM

[75] Inventors: Ronald S. Cassidy, Derry, N.H.; John R. Celli, Long Branch, N.J.; Kevin M. Roselle, Hudson, N.H.

[73] Assignees: American Telephone and Telegraph Company; AT&T Technologies Inc., both of Murray Hill, N.J.

[21] Appl. No.: 759,574

[22] Filed: Jul. 26, 1985

[51] Int. Cl.[4] .............................. H04J 3/24; H04J 3/16
[52] U.S. Cl. ......................................... 370/92; 370/96
[58] Field of Search ...................... 370/85, 91, 92, 94, 370/99, 96, 60; 340/825.5

[56] References Cited

U.S. PATENT DOCUMENTS 4,583,217  4/1986  Kittel ..................................... 370/85
4,594,705  6/1986  Yahata et al. ......................... 370/85

Primary Examiner—Douglas W. Olms
Assistant Examiner—Frank M Scutch, III
Attorney, Agent, or Firm—Samuel R. Williamson

[57] ABSTRACT

A high rate of exchange of information between a control station and each one of multiple associated stations in a key telephone system is economically achieved by using a multipurpose computer in each station to provide the UART function. Serial transmission of asynchronous data is full duplex for the control station and half duplex for ech associated station, with the control station polling a first station and then obtaining that station's response. While the first station is responding, the control station polls a second station and continues in this manner until all the associated stations are polled. The UART function also allows the computer to process other tasks during the same period of time that the serial transmission or reception of data is occurring.

21 Claims, 7 Drawing Sheets

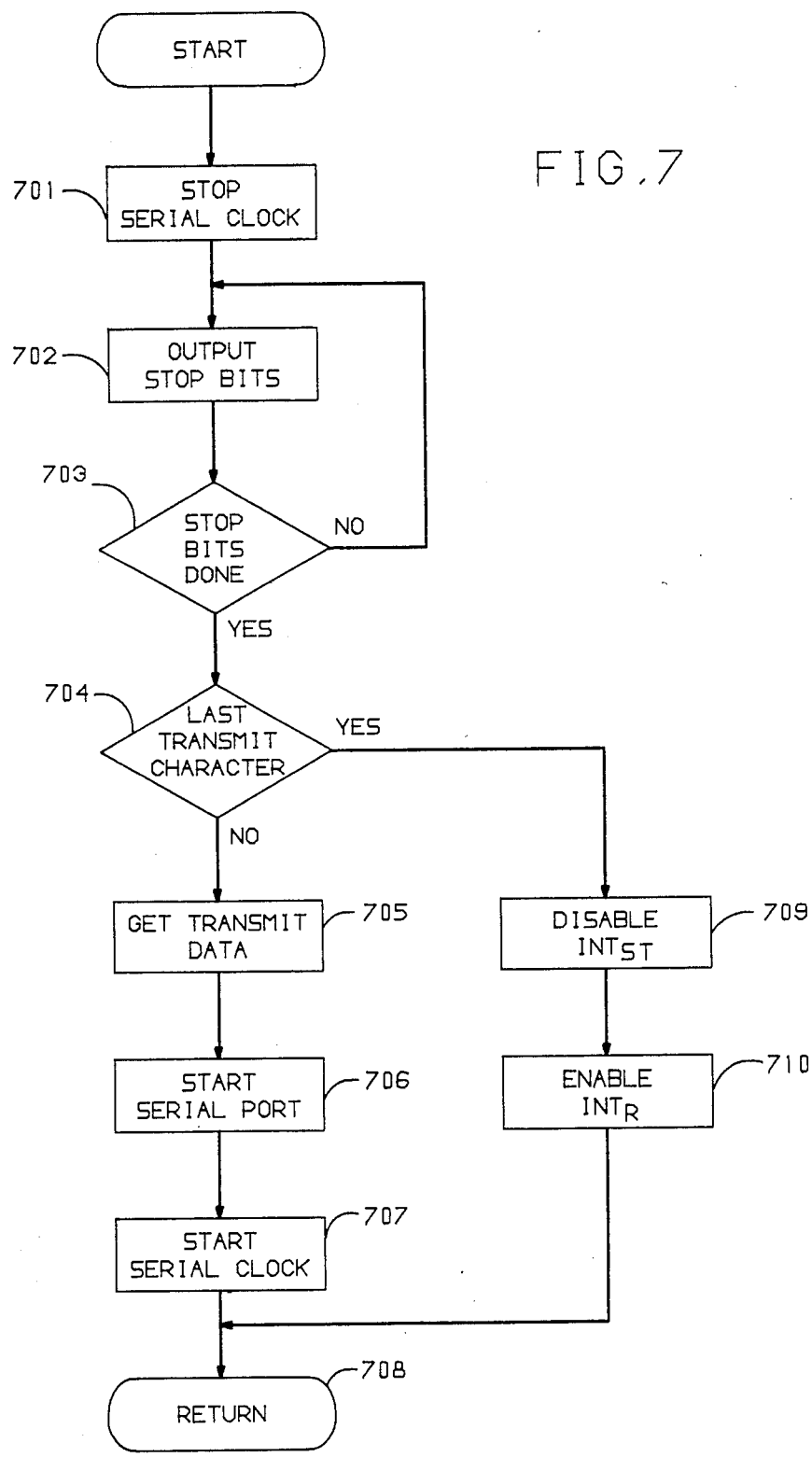

ASYNCHRONOUS ADDRESSABLE ELECTRONIC KEY TELEPHONE SYSTEM

TECHNICAL FIELD

The present invention relates generally to key telephone systems, and more particularly to a key telephone system which allows for asynchronous communications at a high rate of exchange between a master control station and multiple associated telephone station sets.

BACKGROUND OF THE INVENTION

Multiplex systems having duplex communication arrangements are well known in the art. Essentially all modern, complex electronically controlled systems include arrangements for providing communication among various functions or parts of the system as, for example, among a master control key telephone station and a number of associated station sets. By means of such intercommunication, the control station, acting on information received from the station sets and perhaps from elsewhere, typically provides information or instructions back to the station sets.

Asynchronous multiplex systems, such as those disclosed in U.S. Pat. No. 4,097,695 issued to A. G. V. Grace et al. on June 27, 1978, and U.S. Pat. No. 4,325,147 issued to A. P. Rothlauf on Apr. 13, 1982, are known in the art. In such systems, the bits within each character or block of characters relate to a fixed time frame, but wherein the start of each character or block thereof is not necessarily related to such fixed time frame.

Asynchronous multiplex systems avoid the need for transmitting high frequency clock signals between stations by employing at each station an integrated circuit known as a universal asynchronous receiver transmitter (UART). These UARTs have simultaneous receiving and transmitting capabilities and are themselves complete subsystems. They provide the required formatting for converting data words serially received from an external station into parallel format for use by the associated station, and for serially transmitting to an external station those data words input in parallel format by the associated station. Although timing clocks are necessary, the clocks employed by each UART in a pair of stations between which information is communicated need not be synchronous; thus allowing for independent clock generators to be used.

Software UARTs are known to exist in the art. These UARTs, however, are capable of providing only low rate asynchronous communications between stations. Communications with such a UART is achieved by configuring a computer so that it sends and receives serial data through its regular input and output ports and performs the serial to parallel conversion of the data in software. This type of software UART consumes considerable processor time, however, and is only suitable for communicating at relative slow baud rates, i.e., 300 to 1200 baud.

High speed asynchronous multiplex systems in the known art all use standard integrated circuit UARTs at both the sending and receiving station in order to provide the exchange of information at the required rate. These UARTs are complex devices and require considerable circuit integration for the desired operation. With the low cost of many integrated circuits today, including integrated single chip microcomputers, UARTs are comparatively expensive devices. Thus in those system designs having multiple stations and where low cost and high speed are considerations, a requirement of using a UART at each station can easily make the design unattractive. It is desirable, therefore, to have a multiplexed system which allows for asynchronous exchange of information at the desired high rate without the requirement of having a UART associated with each station.

SUMMARY OF THE INVENTION

In accordance with the present invention, a high rate of exchange of information between a control station and each of multiple associated stations in a key telephone system is economically achieved by using a multipurpose computer in each station to provide the UART function. This function is achieved by the computer operating under the control of a precision clock and the addition of some minimal circuitry in each station. In operation, the control station is arranged to sequentially communicate with each associated station. Serial transmission of asynchronous data is full duplex for the control station and half duplex for each associated station, with the control station polling a first station and then obtaining that station's response. While the first station is responding, the control station polls a second station and continues in this manner until all the associated stations are polled. And the UART function in the station allows the computer to process other tasks during the same period of time that the serial transmission or reception of data is occurring. With this arrangement, a very low-cost UART interface is obtained for each station thereby enabling the stations to communicate at a high speed with the master control station.

BRIEF DESCRIPTION OF THE DRAWING

The invention will be more clearly understood from a consideration of the following detailed description of the invention and the accompanying drawing in which:

FIGS. 6 and 7 depict two flow charts illustrating some of the processing performed by the station circuit components of FIG. 3 in accordance with the invention.

DETAILED DESCRIPTION

Figure 1:
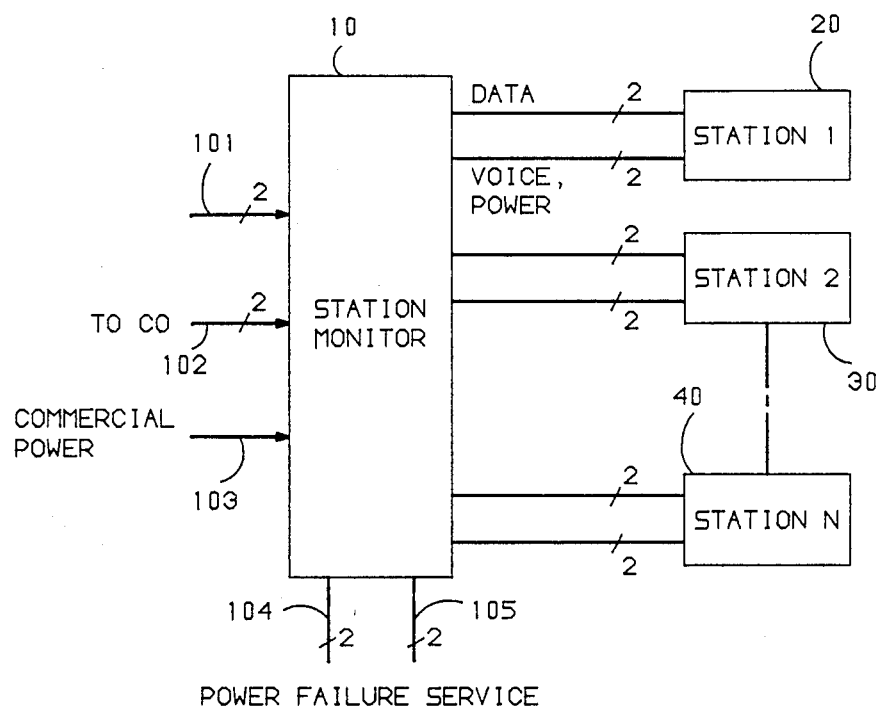
FIG. 1 is a block diagram of a key telephone system with an asynchronous addressing arrangement being employed in a station monitor and multiple telephone stations in accordance with the invention.

Referring now to FIG. 1, there is shown a block diagram of a key telephone system 100, employing an asynchronous addressing arrangement used for exchanging information between a control station or station monitor 10 and multiple stations 20 through 40.

Connected to the station monitor 10 are a pair of tip and ring lines 101 and 102 for connecting the key telephone system to a central office. Commercial power for operation is provided to the key telephone system 100 over a power line 103. In the event that commercial power is interrupted, a pair of interface lines 104 and 105 are available at the station monitor 10 for providing Plain Old Telephone Service (POTS) to the central office through tip and ring lines 101 and 102. Once commercial power is restored, full normal operation of the key telephone system resumes automatically. Stations 20 through 40 are each connected to the station monitor 10 via a two-pair cable. One pair is used for bidirectional data transfer, while the second is used for voice and for providing power to the associated station. The station monitor can easily accommodate up to 10 stations which would be a reasonable upper limit, with only two central office lines available.

Figure 2:
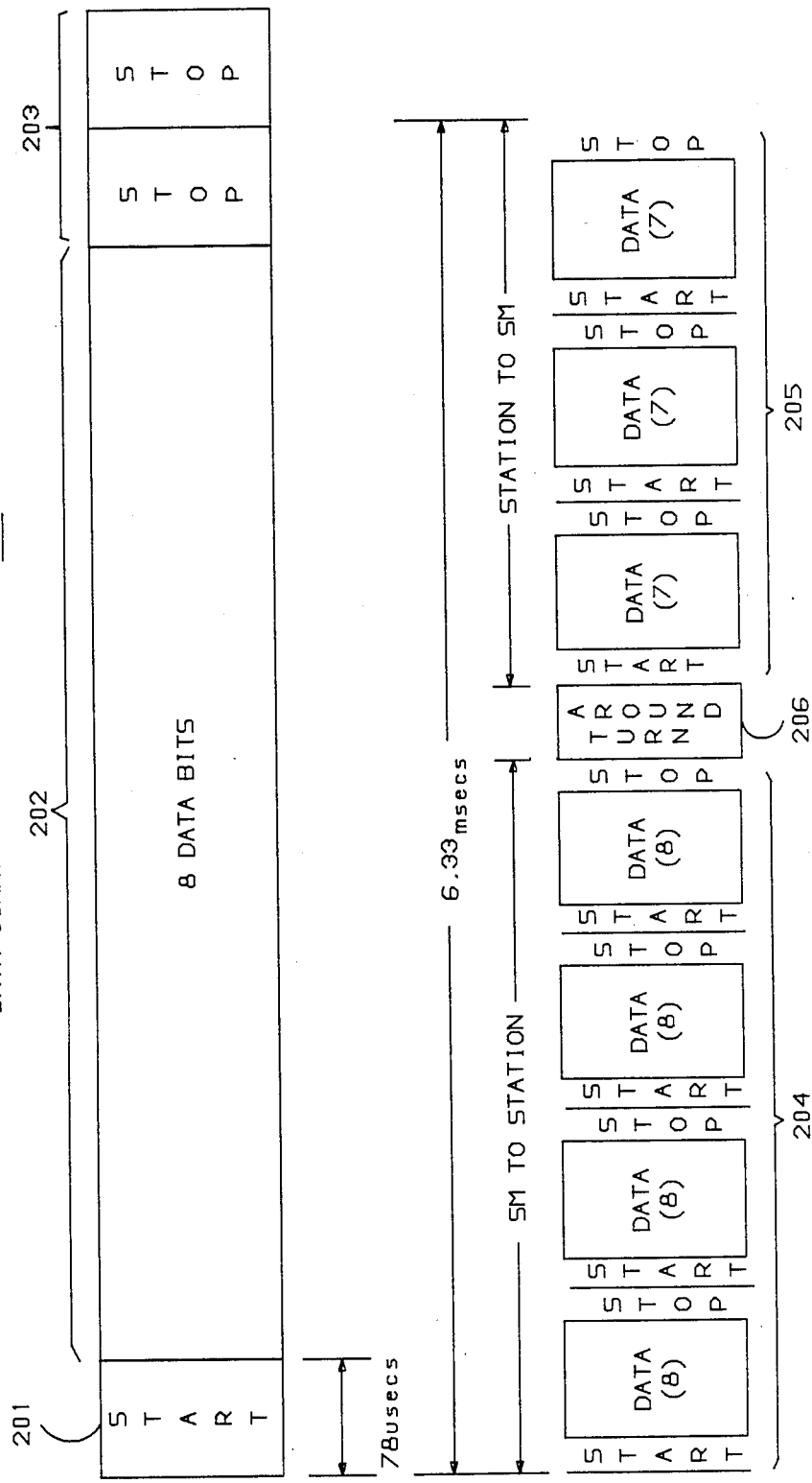
FIG. 2 shows a data communications protocol employed in the key telephone system of FIG. 1 in accordance with the invention.

Referring next to FIG. 2, there is shown a data communications protocol employed in the key telephone system in accordance with the invention. The station monitor 10 is arranged to sequentially communicate with each station 20 through 40 in the illustrated format. Data transmission is full duplex for the station monitor 10 and half duplex for each station, with the station monitor polling a first station and then obtaining that station's response. While the first station is responding, the station monitor polls a second station and continues in this manner until all the associated stations are polled.

The standard arrangement for asynchronous data is shown in format 200 with a character consisting of a start bit 201, eight data bits 202, and two stop bits 203. A first frame 204 consisting of four of these standard 11-bit characters is sent from the station monitor to a station. In response to receipt of this frame by the station, a second frame 205 consisting of three 11-bit characters, but having only seven data bits and three stop bits, is sent from the station to the station monitor. The turn-around time 206, i.e., the time that the station monitor stops transmitting to the time that the station starts transmitting, is 4 bit periods maximum. The data rate is nominally 12.8Kbits/second or 78.1 microseconds per bit.

In operation of the protocol in transmitting from the station monitor to a station, the start bit of each subsequent character is automatically transmitted after the last stop bit of the first, second and third characters. When the last stop bit of the fourth character has been trasmitted from the station monitor, however, the turn-around time period 206 occurs, and the station then transmits its three characters back to the station monitor in a similar format but with the last stop bit of the third character ending the transmission.

Figure 3:
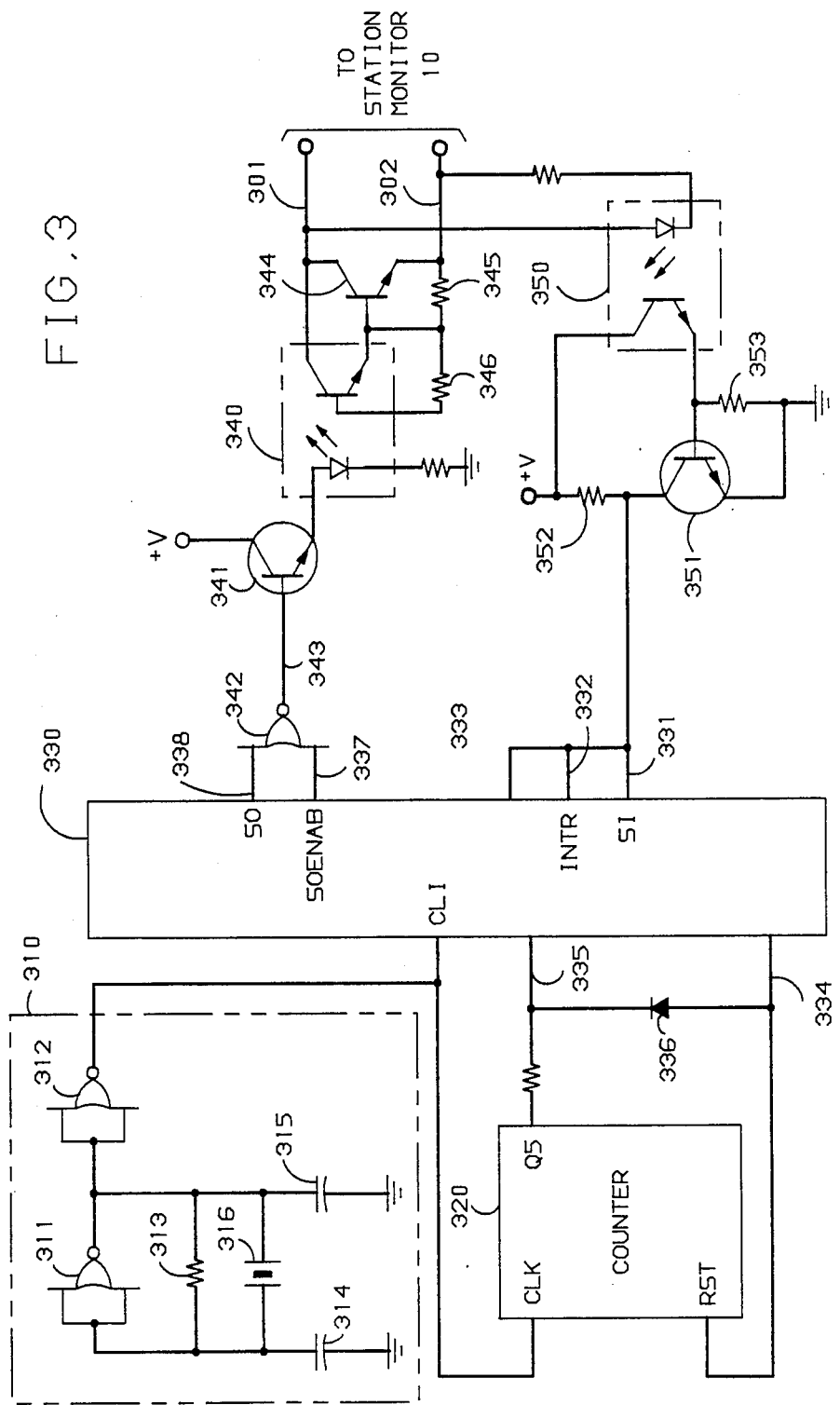
FIG. 3 shows a schematic diagram of the major circuit components employed in each station which operates as a "pseudo" UART and communicates directly with a UART in the station monitor.

Referring now to FIG. 3, there is shown a schematic diagram of the major circuit components in each station which, with the appropriate coding, operates as a "pseudo" UART and communicates directly with a conventional UART in the station monitor 10. This "pseudo" UART provides a very low-cost interface but at the same time allows the stations to communicate at a very high speed.

As shown, the "pseudo" UART circuitry comprises a precision clock circuit 310, a binary ripple counter 320 and a computer 330. A CMOS 4-bit single chip microcomputer is available from NEC Corporation as part NO. uPD7508 and may be used as computer 330 with the proper programming. Also included in the UART circuitry are: optical isolators 340 and 350 with respectively associated transistors 341 and 351 for coupling signals to and from the station monitor 10 over lines 301 and 302.

The precision clock circuit 310 comprises two NOR gates 311 and 312, a resistor 313, two high-frequency biasing capacitors 314 and 315, and a ceramic resonator 316 having close frequency tolerances. Operational requirements for the clock circuit 310 are such that it must be operable at the maximum desired frequency of operation for the computer 330. For timing considerations, the clock circuit must also operate at some multiple of the desired frequency of operation of the UART in the station monitor. Or, an additional clock circuit for the data can be supplied.

The data transmission rate between the station and station monitor is limited primarily by the amount of real time available to the station computer 330 whose central processing unit also performs other functions in the station. And the computer's cycle time (which is derived from the clock circuit 310) governs its ability to react to a start bit and store the received information.

In operation, data is received from the station monitor's UART via a standard optical isolator 350. An inverter circuit comprising transistor 351 and resistors 352 and 353 amplifies and inverts this data signal before coupling it to the serial input (SI) of computer 330 on line 331. Since no preliminary indication is provided to the computer 330 as to when to expect to start receiving data from the station monitor, an external interrupt sense input $INT_R$ available on computer 330 is connected via line 332 in parallel with the serial input line 331 and is used to detect the start bit of the first character transmitted from the station monitor 10. This interrupt, triggered by a rising edge, is defined as the transition from a logic LOW level to a logic HIGH level.

In asynchronous communications, normally a start bit is defined as a transition from a logic HIGH level to a logic LOW level and maintained at the LOW level for one bit period. Since the interrupt sense input 332 is activated by the rising edge of the data pulse, the inversion requirement for the data is performed by transistor 351 before it reaches the computer 330.

Another external sense input available on computer 330 is also connected via line 333 in parallel to the serial input line 331 and is used to further aid in determining whether an interrupt is being caused by a true start bit or by spurious noise. This additional sense input further insures that the computer 330 does not blindly start clocking in data without assuring itself that a true start bit has been received.

Once the computer 330 has determined that a valid start bit has been received, it disables the interrupt sense input on line 332 so that the data itself does not cause interrupts. The computer 330 next enables the ripple counter 320 by providing a logic LOW level out on line 334. Enabled the ripple counter 320, in turn, oscillates precisely at the incoming data rate and provides clock pulses over line 335 to a serial clock input port of the computer 330.

The ripple counter 320, which gets its clock pulses from the precision clock circuit 310, is enabled by the incoming start bit in order to insure that clock pulses for the serial clock input port on line 335 are synchronized with the incoming data. Although the clock pulses from the ripple counter 320 are synchronized with the incoming data, they are delayed slightly because the ripple counter, once enabled, has to count up to a predetermined number after which it begins providing output pulses at the desired reduced frequency. This is achieved through utilization of the count reduction circuitry in the ripple counter 320 which takes the output frequency of the precision clock circuit 310 and reduces it to that of the incoming data, which in this embodiment is 1/32nd of the precision clock circuit frequency. The rising edge of each clock pulse thus coincides with an incoming data bit, and occurs so that a "sample" (test for logic HIGH or logic LOW) may be taken around the center of the incoming data bit. This guards against phase errors which could result if the sample is taken too late or too early.

When the computer 330 has received eight data bits, it stops the ripple counter 320 by putting a logic HIGH level out on line 334. This same signal is also directly coupled by diode 336 to the serial clock input port on line 335, and also holds it at a logic HIGH when not clocking in data. By using the signal available on line 334 for this control, both the synchronous starting of the serial clock and the serial clock control requirements are met with just one control signal.

After receiving four characters of data from the station monitor 10, the station computer 330 is reconfigured to transmit three characters of information back to the station monitor 10. In that the internal serial shift register (not shown) in the station computer 330 is only eight bits wide, and 11 bits must be transmitted, certain tasks are done by both software and hardware for the station computer 330 to transmit the required 11 data bits, the software being described in greater detail later herein.

In general, the start bit is generated in software by making the first bit to be transmitted to the station monitor 10 a zero. When the serial shift register in the computer 330 is loaded with data that is ready to be transmitted, the computer 330 provides a logic LOW out on line 334 to start the ripple counter 320 which, in turn, pulses the serial clock input port connected to line 335. Immediately thereafter, the computer 330 provides a logic LOW on its serial out enable (SOENAB) port connected to line 337 reflecting that the data is about to be shifted out of the serial out (SO) port connected to line 338.

To provide control of the transmission of the SO data by the SOENAB port, the SOENAB line 337 and the SO line 338 are both input into a NOR gate 342. When the SOENAB line 337 is HIGH, the output of the NOR gate 342 on line 343 is forced LOW inhibiting the output signal. When the SOENAB lead 337 is LOW, the output from the NOR gate on line 343 is provided as the inverse of the SO signal on line 338. The output of the NOR gate 342 is connected to the base of transistor 341 which, in turn, drives the optical isolator 340. And data from the output of the optical isolator 340 is coupled via a driver circuit, comprising transistor 344 and resistors 345 and 346, onto the transmission lines 301,302 which connects to the UART in the station monitor 10.

After eight bits have been clocked out of the SO port onto line 338, the computer 330 provides a logic HIGH at the SOENAB port on line 337, which forces the output of the NOR gate 342 LOW for a predetermined time period. This provides the stop bits necessary for the UART in the station monitor 10 at the end of each character of information. Immediately after pulling the SOENAB port HIGH, the computer 330 places a HIGH level out on lead 334, which stops the ripple counter 320 and inhibits the serial clock input port connected to line 335. This routine is repeated for each character of information sent to the station monitor 10 from the SO port on line 338.

Figure 4:
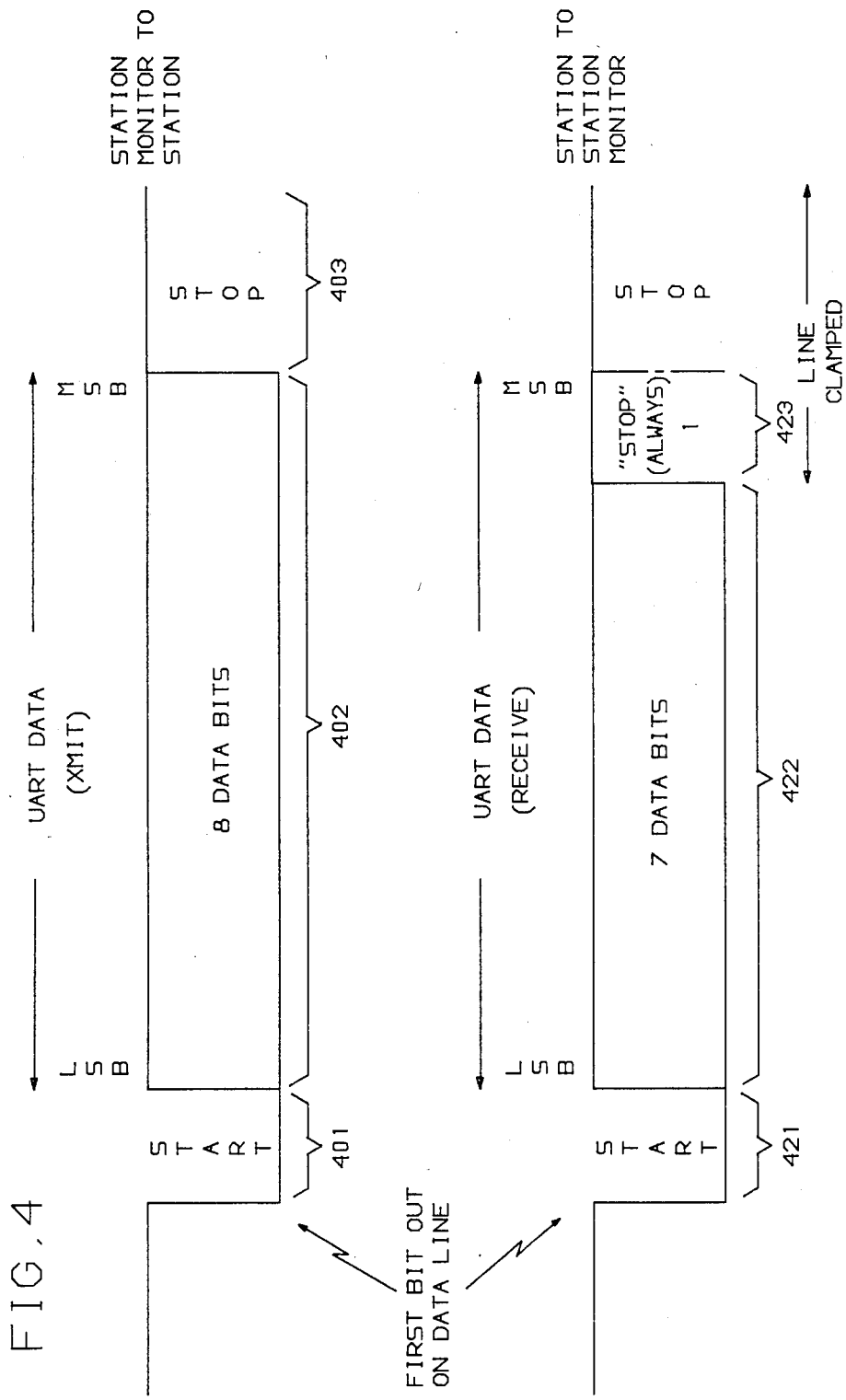
FIG. 4 shows the format in which data is transmitted between the station monitor and each station of the key telephone system of FIG. 1.

Referring next to FIG. 4, there is shown the detailed format in which data is transmitted from the station monitor 10 to a station, e.g. station 20, and also from station-20 back to the station monitor 10. In the asynchronous multiplexed system described herein, eight data bits along with a start bit and two stop bits are sent to each station by the UART contained in the station monitor 10. As earlier indicated, however, only seven data bits are sent back to the UART in the station monitor. And to generate a start bit, a zero is loaded into the first bit position of the eight-bit serial shift register of the computer 330 along with the other seven data bits. It is to be understood, however, that serial shift registers of different bit sizes or additional hardware or software may be employed in this invention and, therefore, other data bit sizes, including a start and multiple stop bits if desired, may be easily transmitted from those registers in accordance with the principles of this invention.

As seen in FIG. 4, the characters transmitted by the station monitor 10 and received by the station are arranged in a standard configuration formatted by a conventional UART. The first bit transmitted from the station monitor 10 is a start bit 401, followed by eight data bits 402 and two stop bits 403. The first bit transmitted from a station and received by the station monitor is a start bit 421, followed by seven data bits 422. After the last data bit has been sent by the station, the data line is clamped to mark or logic HIGH for three bit periods in order to generate three stop bits. The UART in the station monitor 10 sees the start bit 421 and then clocks in eight data bits into its receive register in the order of the least significant bit (LSB) first, on to the most significant bit (MSB). Bit 423, the last bit clocked in and also the MSB, is the first of three stop bits generated by the station clamping the line to mark. Therefore, this bit will always be a one, while the other seven bits can be either a one or zero.

The protocol described herein can easily accommodate up to a ten-station system. Since each station receives 44 bits from the station monitor 10 and then transmits 33 bits back, a certain amount of time is required for the station monitor 10 to communicate with each station. This time is minimized by having the UART in the station monitor 10 transmitting to one station while simultaneously receiving from another, since the UART operates in a full duplex mode. The scan time for a station is the time necessary for the station monitor 10 to transmit 44 bits or 3.42 milliseconds. The switching overhead of the UART and associated circuitry adds approximately 10 to 20 microseconds to this time. This brings the time up to 3.45 milliseconds per station, or, for a ten station system, a system scan time of 34.5 milliseconds.

Figure 5:
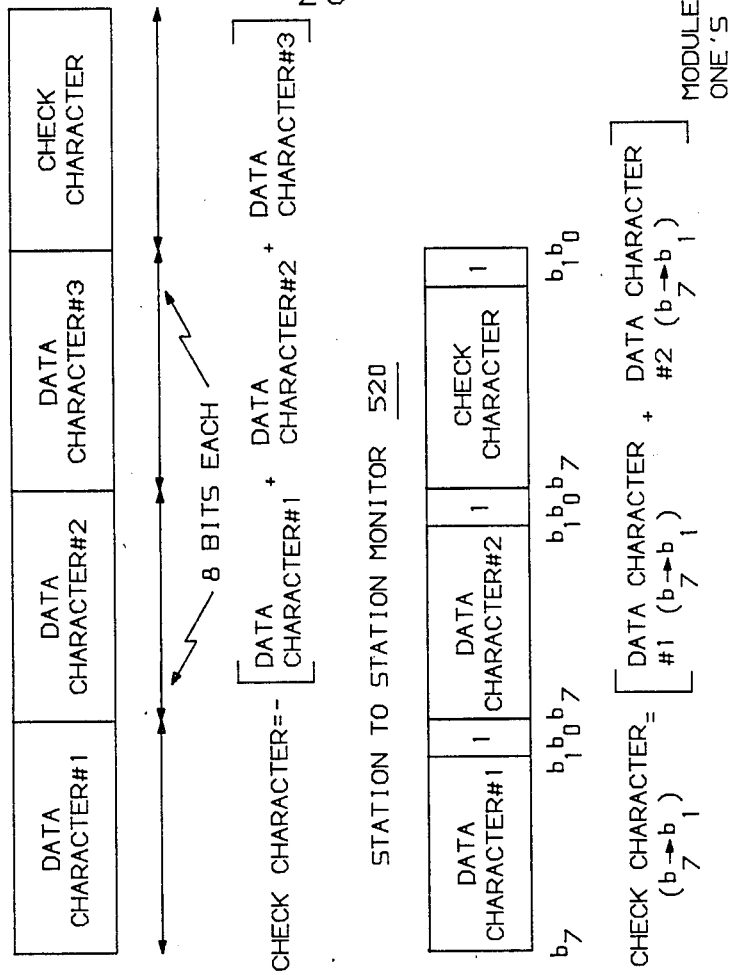
FIG. 5 shows an arrangement for checking the accuracy of the data exchanged between the station and the station monitor of FIG. 1.

In order to insure accurate exchange of data between each station and the station monitor 10, an arrangement for checking the accuracy of the transmitted data is provided as shown in FIG. 5. Four eight-bit data characters are contained in frame 510 transmitted by the station monitor 10. The first three characters carry line-status information from the station monitor 10 and the last character is used as a check character for error detection. The check-character is defined as the negative of the one's complement sum of the previous data characters (which equal three in this instance). A more detailed discussion of check characters may be found in an article by John G. Fletcher, "An Arithmetic Checksum for Serial Transmission," *IEEE Trans. on Communications,* Vol. COM-30, January 1982, p. 247. If the check character calculated by the station does not match the check character received from the station monitor, an error condition is noted as having occurred and the station ignores the message.

In the station to station monitor direction, three characters are transmitted in frame 520: the first and second are used to carry information while, just as in the station monitor to station direction, the last character is used as a check character for error detection. Since only seven data bits are used in this embodiment for each character, the check algorithm is performed on only these seven bits in each character.

In the station monitor to station direction, the complete system status is available on every scan. If a data error is detected, the station does not take any action until the next correct frame is received. Similarly, in the station to station monitor direction, the station monitor will not take action on a frame that contains an error (bad check character). Any new status such as button depression information is always sent by the station for a number of predetermined scans to insure correct reception since the protocol arrangement only addresses error detection rather than retransmission.

Figure 6:
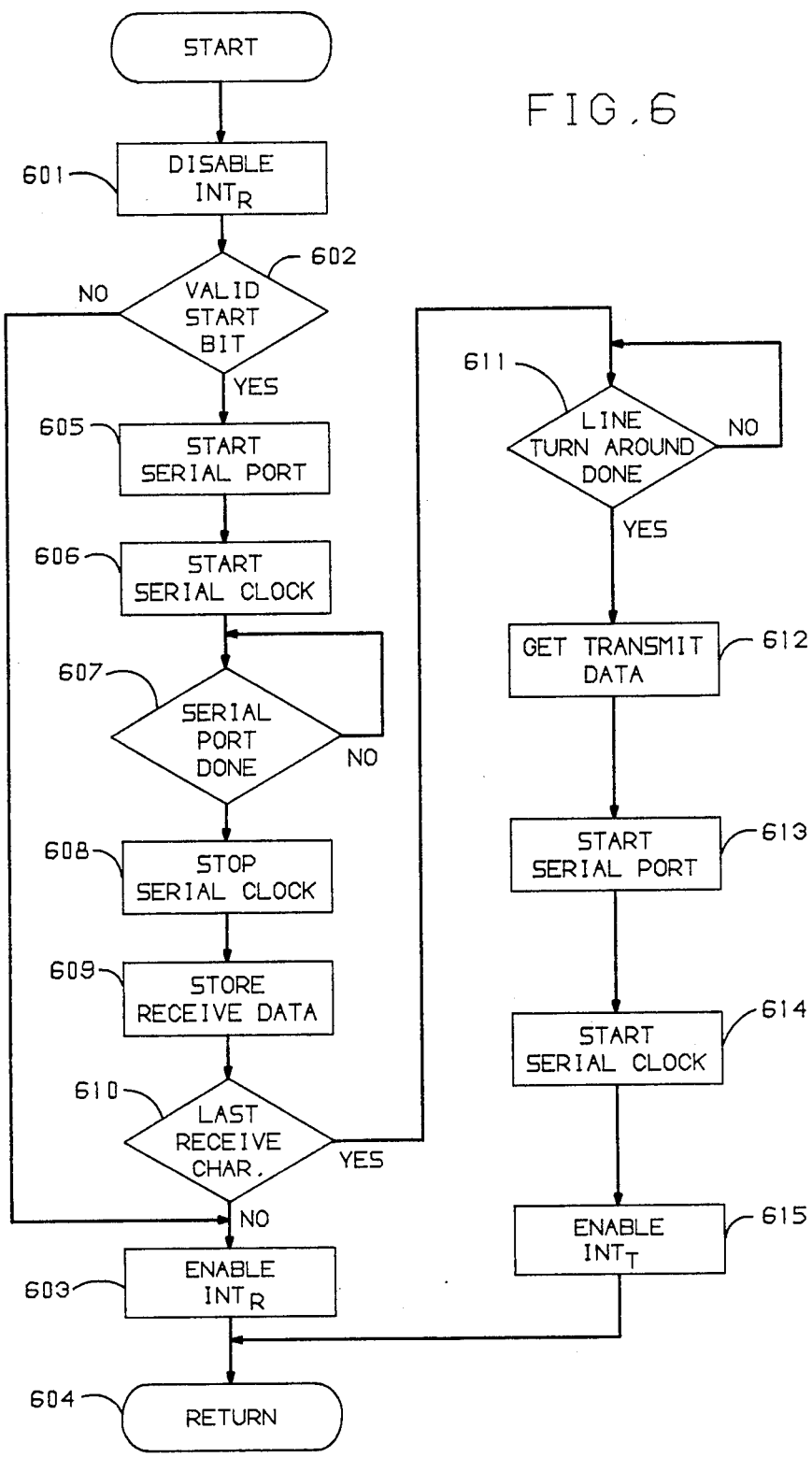

Referring now to FIGS. 6 and 7, there are shown two flow charts illustrating the processing performed by the station circuitry of FIG. 3. This processing is advantageously determined by a process or program stored in memory in the computer 330. The flow charts describe routines which are used by the station circuitry in receiving and transmitting serial asynchronous data respectively from and to the station monitor 10. The data receive routine is activated once for each of the characters that the station receives. The data transmit routine consists of two parts. The first part is activated after the last incoming character in a frame is received by the station. And the second part is activated for each subsequent character that the station transmits.

The process is entered at step 601 when the data receive interrupt ($INT_R$) occurs thereby activating the data receive routine. The data receive interrupt $INT_R$ is normally enabled, and the data transmit routine is disabled when the station is waiting to receive data. This is so that a processor (not shown) in the computer 330 can do other things such as processing line status information and scanning keys for button depression information while waiting to receive data. Once the data receive interrupt $INT_R$ occurs, the processor stops whatever it is then working on and enters the data receive routine.

With the data receive interrupt $INT_R$ disabled at step 601, the process advances to decision 602 where the incoming signal is examined to determine if it is a valid start bit. If the interrupt was caused by something other than a valid start bit, the data receive interrupt $INT_R$ is enabled at step 603, the routine is exited, and the processor returns from the data receive routine at step 604 to continue working on whatever it was working on prior to the interrupt occurring. If a start bit is validated at step 602, the process moves to step 605 where the serial port of the serial shift register in the computer 330 is enabled, and next to step 606 where the clock for the serial shift register is enabled.

The process next advances to decision 607 where the received data bits are counted as they enter into the serial shift register. After the last bit has been received, the process advances to step 608 where the serial clock is turned off and then to step 609 where the received data is moved from the serial shift register to an internal buffer (not shown) in the computer 330. At decision 610, it is decided if the character received is the last of the receive characters. If not, the data receive interrupt $INT_R$ is enabled at step 603 to await the reception of a valid start bit for the next one of the remaining characters, and the processor returns to executing its normal instructions.

If the character received is the last of the receive characters, the processor is reconfigured to transmit the first transmit character to the station monitor 10 with the data transmit routine. Before sending the first character to the station monitor 10, however, a prescribed delay is provided at decision 611 to provide a minimum line turn around time.

The first part of the data transmit routine is entered at step 612 where the data for the first transmit character is fetched from the internal buffer and loaded into the serial shift register. Both the data receive interrupt $INT_R$ and a data transmit interrupt $INT_T$ are inhibited at this stage in the process. The serial port is enabled at step 613, and the serial clock is turned on at step 614, thereby starting the sending of the first transmit character to the station monitor 10. The data transmit interrupt $INT_T$ is also enabled at step 615 to await the next transmit interrupt signal and the routine is exited at step 601. This allows the processor in computer 330 to resume background processing, i.e., scanning keys and processing line status information while the character is being transmitted.

The processor continues with this normal background processing until a data transmit interrupt $INT_T$ occurs. This interrupt is caused initially by the last data bit of the first transmit character being transmitted to the station monitor 10 and subsequently by the last data bit of each transmit character as it is transmitted.

Upon receiving the transmit interrupt $INT_T$, the second part of the data transmit routine is activated and the process is entered at step 701 as shown in FIG. 7, where the serial clock is turned off. The process next advances to step 702 where the appropriate number of stop bits are transmitted appended to the data bits. At the decision 703, the process checks to see if the appropriate number of stop bits have been appended. If not, the process causes the correct number to be appended.

At decision 704, a check is made to determine if the character being transmitted is the last expected transmit character. If not, the next transmit character is transferred from the internal buffer to the serial shift register at step 705. The serial port is enabled at step 706 and the serial clock is turned on at step 707 thereby starting the sending of the transmit character to the station monitor 10. The routine is then exited at step 708 and the processor returns to its normal processing while awaiting a data transmit interrupt $INT_T$.

If it is determined at the decision 704 that the last expected character has been transmitted to the station monitor 10, the data transmit interrupt $INT_T$ is disabled at step 709 and the data receive interrupt $INT_R$ is enabled at step 710, which allows received characters to be sensed once again. The routine is then exited at 708 and the processor resumes normal processing.

Various modifications of this invention are contemplated and may obviously be resorted to by those skilled in the art without departing from the spirit and scope of the invention as hereinafter defined by the appended claims.

What is claimed is:

1. An asynchronous addressable multiplex system comprising:
   a master control station having means for formatting and transmitting a series of outgoing message blocks and for receiving and interpreting a series of incoming message blocks;
   a plurality of satellite stations operatively responsive to the master control station and connected in parallel thereto, the satellite stations including communication means for receiving and interpreting the series of message blocks from the master control station, and for formatting and transmitting a series of message blocks to the master control station, the communication means comprising a computer in each of the plurality of satellite stations, the computer including serial register means for assembling each received and transmitted message block, and a serial input port and a serial output port both connected to the serial register means, each of the plurality of satellite stations further comprising a first clock means for timing the formatting, transmitting and receiving of the series of message blocks, and count reducing means for controlling the reception of and transmission of message blocks by the satellite station, the count reducing means being responsive to the first clock means and providing a clock signal for enabling the serial ports of the computer when message blocks are being transferred, the computer providing direct asynchronous communications for the satellite station with the master control station through the serial ports.

2. The asynchronous addressable multiplex system of claim 1 wherein the master control station further comprises a second clock means for timing the formatting, transmitting and receiving of the series of message blocks, the first and second clock means being independent of each other.

3. The asynchronous addressable multiplex system of claim 2 wherein the clock signal provided by the count reducing means is provided at the transfer rate of data comprising the message blocks.

4. The asynchronous addressable multiplex system of claim 2 wherein the communication means for transmitting data comprising the message blocks further includes a first optical isolator means for causing data provided at the serial output port to be coupled onto a two-wire transmission path interconnecting the satellite station with the master control station.

5. The asynchronous addressable multiplex system of claim 4 wherein the communication means for receiving data comprising the message blocks further includes a second optical isolator means for causing data received over the two-wire transmission path to be coupled to the serial input port.

6. The asynchronous addressable multiplex system of claim 5 wherein the communication means in each satellite station further includes control means operative in combination with the count reducing means for controlling the reception of and transmission of message blocks by the satellite station, the control means comprising sensing means for detecting reception of a first data bit of each message block received from the master control station over the two-wire transmission path, the control means enabling the count reducing means upon receipt of this first data bit.

7. The asynchronous addressable multiplex system of claim 6 wherein the control means further comprises enabling means responsive to the serial register means being loaded with a message block for transmission to the master control station, the enabling means allowing the data from the serial output port to be coupled to the first optical isolator.

8. The asynchronous addressable multiplex system of claim 2 wherein a first one of the plurality of satellite stations in response to and after reception of a series of incoming message blocks from the master control station responds by transmitting a series of message blocks back to the control station, the control station sending a series of message blocks to another one of the stations during reception of the message blocks from the first satellite station.

9. An asynchronous addressable multiplex system comprising:
   a master control station having means for formatting and transmitting a series of outgoing message blocks;
   a satellite station operatively responsive to the master control station and connected in parallel thereto, the satellite station including communication means for receiving and interpreting the message blocks from the master control station, the communication means comprising a computer in the satellite station, the computer including a serial input port and serial register means for respectively receiving and assembling each message block, the satellite station further comprising a first clock means for timing the formatting and receiving of the series of message blocks, and count reducing means for controlling the reception of message blocks by the satellite station, the count reducing means being responsive to the first clock means and providing a clock signal for enabling the serial input port of the computer when message blocks are being received, the computer providing for direct reception of asynchronous communications for the satellite station from the master control station through the serial input port.

10. The asynchronous addressable multiplex system of claim 9 wherein the master control station further comprises a second clock means for timing the formatting and transmitting of the series of message blocks, the first and second clock means being independent of each other.

11. The asynchronous addressable communication system of claim 10 wherein the clock signal provided by the count reducing means is provided at the reception rate of data comprising the message blocks.

12. The asynchronous addressable communication system of claim 11 wherein the communication means further includes control means operative in combination with the count reducing means for controlling the reception of message blocks by the satellite station, the control means comprising sensing means for detecting reception of a first data bit of each message block received from the master control station, the control means enabling the count reducing means upon receipt of this first data bit.

13. An asynchronous addressable multiplex system comprising:
   a master control station having means for formatting and transmitting a series of outgoing message blocks and for receiving and interpreting a series of incoming message blocks;

a plurality of satellite stations operatively reponsive to the master control station and connected in parallel thereto, the satellite stations including communication means for receiving and interpreting the series of message blocks from the master control station, and for formatting and transmitting a series of message blocks to the master control station, the communication means comprising circuitry in each of the plurality of satellite stations, the circuitry including serial register means for assembling each received and transmitted message block, a serial input port and a serial output port both connected to the serial register means, and a central processing unit for interpreting the received message blocks and for formatting the outgoing message blocks, each of the plurality of satellite stations further comprising a first clock means for timing the formatting, transmitting and receiving of the series of message blocks, and count reducing means for controlling the reception of and transmission of message blocks by the satellite station, the count reducing means being responsive to the first clock means and providing a clock signal for enabling the serial ports when message blocks are being transferred, the circuitry providing direct asynchronous communications for the satellite station with the master control station through the serial ports.

14. The asynchronous addressable multiplex system of claim 13 wherein the master control station further comprises a second clock means for timing the formatting, transmitting and receiving of the series of message blocks, the first and second clock means being independent of each other.

15. The asynchronous addressable multiplex system of claim 14 wherein the block signal provided by the count reducing means is provided at the transfer rate of data comprising the message blocks.

16. The asynchronous addressable multiplex system of claim 14 wherein the communication means for transmitting data comprising the message blocks further includes a first optical isolator means for causing data provided at the serial output port to be coupled onto a two-wire transmission path interconnecting the satellite station with the master control station.

17. The asynchronous addressable multiplex system of claim 16 wherein the communication means for receiving data comprising the message blocks further includes a second optical isolator means for causing data received over the two-wire transmission path to be coupled to the serial input port.

18. The asynchronous addressable multiplex system of claim 17 wherein the communication means in each satellite station further includes control means operative in combination with the count reducing means for controlling the reception of and transmission of message blocks by the satellite station, the control means comprising sensing means for detecting reception of a first data bit of each message block received from the master control station over the two-wire transmission path, the control means enabling the count reducing means upon receipt of this first data bit.

19. The asynchronous addressable multiplex system of claim 18 wherein the control means further comprises enabling means responsive to the serial register means being loaded with a message block for transmission to the master control station, the enabling means allowing the data from the serial output port to be coupled to the first optical isolator.

20. The asynchronous addressable multiplex system of claim 14 wherein a first one of the plurality of satellite stations in response to and after reception of a series of incoming message blocks from the master control station responds by transmitting a series of message blocks back to the control station, the control station sending a series of message blocks to another one of the stations during reception of the message blocks from the first satellite station.

21. The asynchronous addressable multiplex system of claim 20 wherein the message blocks transmitted by the master control station comprise four eight-bit words and the message blocks transmitted by each satellite station comprise three seven-bit words.

* * * * *